United States Patent [19]

Boer et al.

[11] Patent Number: 4,577,334

[45] Date of Patent: Mar. 18, 1986

[54] DIGITAL DATA RECEIVER INCLUDING TIMING ADJUSTMENT CIRCUIT

[75] Inventors: Jan Boer, Utrecht; Wilhelmus J. M. Diepstraten, Diessen, both of Netherlands

[73] Assignee: NCR Corporation, Dayton, Ohio

[21] Appl. No.: 670,425

[22] Filed: Nov. 9, 1984

[30] Foreign Application Priority Data

Jan. 13, 1984 [GB] United Kingdom ............... 8400922

[51] Int. Cl.[4] ............................................. H04L 7/10
[52] U.S. Cl. ..................................... 375/97; 375/111; 375/118
[58] Field of Search ................. 375/39, 118, 97, 111, 375/49, 83, 86; 364/726

[56] References Cited

U.S. PATENT DOCUMENTS

| 3,758,870 | 9/1973 | Schmitt et al. | 329/104 |
| 4,039,748 | 8/1977 | Caron et al. | 178/69.1 |
| 4,137,427 | 1/1979 | Choquet et al. | 375/83 |
| 4,227,252 | 10/1980 | Godard | 375/118 |
| 4,313,202 | 1/1982 | Kameya | 375/15 |
| 4,458,355 | 7/1984 | Motley et al. | 375/99 |

FOREIGN PATENT DOCUMENTS 0063842 4/1982 European Pat. Off.

Primary Examiner—Marc E. Bookbinder
Assistant Examiner—Andrew J. Telesz, Jr.
Attorney, Agent, or Firm—Wilbert Hawk, Jr.; Albert L. Sessler, Jr.; George Jameson

[57] ABSTRACT

Digital Data receiving apparatus includes means for adjusting the timing of the sampling instants. A phase controlled oscillator (PCO 19) provides timing signals for sampling the received signal and is controlled, at the commencement of a received signal, by a timing initialization circuit (17) responsive to repetitive phase alterations in a training sequence. The timing initialization circuit (17) includes a plurality of Discrete Fourier Transform (DFT) circuits (23) responsive to frequencies dependent on the power spectral densities of the received signal, which received signal may be modulated at a normal rate or a fall-back rate. The DFT circuits (23) measure the correlation of locally-generated frequencies with the incoming samples for a predetermined number of such samples to produce a plurality of complex signals. A selector circuit (24) selects a pair of the complex signals dependent on the modulation rate. The provided pair of complex signals are multiplied in a complex conjugate multiplier (25) to produce a complex output signal which is fed to a phase segment detector (26) to provide a complex rotated signal. The complex rotated signal is converted in a phase-to-time-shift converter circuit (27) to a signal (m) for controlling the PCO 19.

12 Claims, 11 Drawing Figures

DIGITAL DATA RECEIVER INCLUDING TIMING ADJUSTMENT CIRCUIT

BACKGROUND OF THE INVENTION

This invention relates to digital data receiving apparatus for receiving a data modulated carrier signal.

The invention has a particuar application where the data is transmitted in phase shift keyed (PSK) or quadrature amplitude modulation (QAM) form.

In current high speed digital modems, especially in multi-point networks, the effective data throughput is highly dependent on the start-up time of the modem receiver. Thus, it is advantageous that the start-up time should be as short as possible.

Current high speed modems may operate at speeds as high as 9600 bps (bits per second). With such high speed modems, the amplitude and delay distortion experienced on telephone lines are much larger than with lower speed modems, because of the considerably broader band-width they use. Also, because of the higher sensitivity to any kind of disturbance of such modems, it is desirable to achieve fast and accurate receiver timing synchronization, prior to initialization of the modem equalizer.

From U.S. Pat. No. 4,039,748, there is known a receiver for receiving digital data, including a synchronization device for adjusting the phase of sampling clock signals. In one embodiment disclosed in the U.S. Pat. No. 4,039,748, an initialization sequence consisting of a series of values +1, −1, +1 ... is utilized by a synchronization device, which includes a pair of narrow band recursive filters, to provide for initial receiver timing synchronization. The known apparatus has the disadvantage that the synchronization device is slow to achieve accurate timing initialization; that is, the device suffers from so-called turn-on effects.

SUMMARY OF THE INVENTION

It is an object of the present invention to provide a digital data receiver for receiving modulated data wherein the aforementioned disadvantage is alleviated.

Therefore, according to the present invention, there is provided in a data receiving apparatus for receiving a data modulated carrier signal and including a sampling circuit responsive to sampling clocks for sampling the received signal, a phase controlled oscillator for developing the sampling clocks, and an analog-to-digital converter for converting the sampled received signal to a digitized sampled received signal, a timing adjustment system comprising: a signal transform circuit including first and second Discrete Fourier Transform filter circuits and adapted to provide first and second complex signals as a function of the correlation between said digitized sampled received signal and each of first and second predetermined locally generated frequencies, having values of $f_c - \frac{1}{2}f_b$ and $f_c + \frac{1}{2}f_b$, respectively, where $f_c$ and $f_b$ are the carrier frequency and the modulation frequency, respectively; complex conjugate multiplier means being responsive to said first and second complex signals for providing a complex output signal; and conversion means responsive to said complex output signal for applying an adjustment signal to said phase controlled oscillator to selectively adjust the phase of said sampling clocks to define the sampling instants at which said received signal is sampled.

It is found that a data receiver according to the invention has a fast synchronization adjustment. A further advantage is that the synchronization operation is relatively insensitive to degradation by line distortion.

In the preferred embodiment, the data may be transmitted at a normal modulation rate or a fall-back modulation rate. Discrete Fourier Transform (DFT) circuits are provided in correspondence with the possible modulation rates, and the outputs of the DFT circuits are utilized to determine the current modulation rate. Furthermore, a determination is made as to whether a training sequence or data is being received.

BRIEF DESCRIPTION OF THE DRAWINGS

One embodiment of the invention will now be described by way of example with reference to the accompanying drawings, in which.

DESCRIPTION OF THE PREFERRED EMBODIMENT

Figure 1:
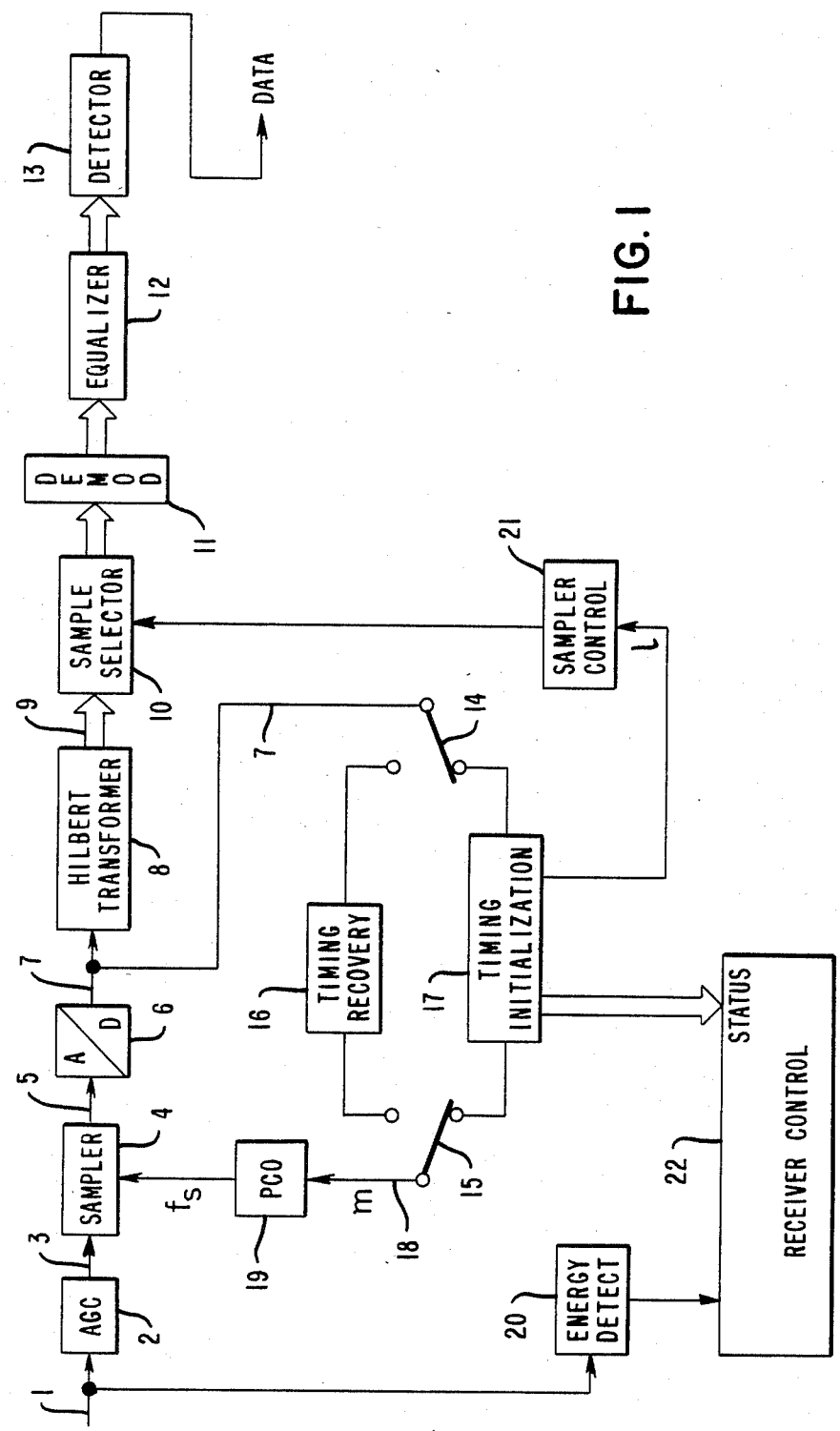
FIG. 1 shows a modem receiver incorporating a timing initialization circuit.

Referring first to FIG. 1, the principal components of a modem receiver for receiving phase modulated signals, incorporating the device of the invention, are shown. A received line signal 1 is applied to an automatic gain control (AGC) circuit 2, which provides on an output line 3 a signal having a normalized level. The signal on the line 3 is sampled by a sampling circuit 4 in response to a sample clock having a sample rate $f_s$ which is a multiple i of the modulation rate $f_b$. The resulting analog signal samples on a line 5 are applied to an analog-to-digital converter 6. The digitized samples on a line 7 are processed by a Hilbert transformer 8, to provide an output in the form of a complex signal, of which the real part is the band-pass filtered result of the samples on the line 7 and the imaginary part the Hilbert transform (90° shift applied) of the filtered result. A sample selector 10 transfers every i-th sample to a demodulator 11 (i=the ratio between sample rate and modulation rate), thus transforming the processing per sample to processing per symbol. It should be understood that one symbol is transferred per modulation interval. The sample selector 10 is controlled by a sampler control circuit 21. The resulting signal is demodulated in the demodulator circuit 11. The demodulated signal is equalized by an equalizer 12 and fed into a data detector 13 to provide a DATA output. The circuits 8, 10, 11, 12 and 13 are of a type conventionally used in data modem receivers and will not be described in detail.

The sampling instant in the sampling circuit 4 is determined by a phase controlled oscillator (PCO) circuit 19. The phase of the PCO circuit 19 is controlled by an input 18, which supplies a signal representing an 8-bit value m that represents a phase shift for the sample clock from the PCO 19 to the sampling circuit 4. Briefly, the PCO 19 may include a counter dividing a 2.304 MHz clock down to twice the sample clock of 9600 Hz. Once per baud, this counter is preset with the value m to count a sample interval. For the remaining sample intervals, the counter is automatically preset with a nominal value m-nom which, in the present embodiment, is the binary equivalent of the decimal number 120, since $(2304)/2(9.6) = 120$.

The start of an incoming line signal is detected by an energy detector circuit 20. When the energy level of the signal on the line 1 exceeds a certain threshold, the energy detector circuit 20 provides an output signal to a receiver control circuit 22, which operates switches 14 and 15 to the position shown, thereby rendering a timing initialization circuit 17 effective. The timing initialization circuit 17 will be described in more detail hereinafter. During receipt of data following a training sequence, the switches 14 and 15 select a timing recovery circuit 16. The signal value m is derived in the timing recovery circuit 16 during the receipt of data to provide optimal sampling timing information. However, since the timing recovery circuit 16 forms no part of the present invention, it will not be further described herein.

The first part of the signal received over the line 1 is a receiver training sequence which is formed by a predetermined number of data symbols with two alternating phases modulated at a rate $f_b$ on the carrier frequency $f_c$.

Figure 2A:
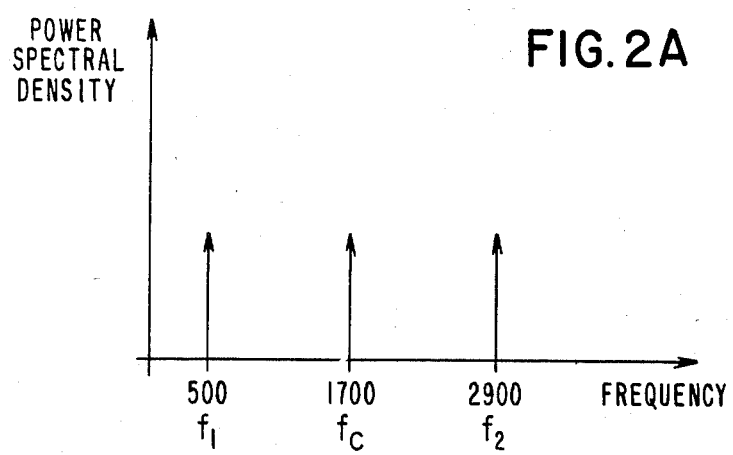
FIGS. 2A and 2B show power spectral density plots for training signals at the normal and fall-back modulation rates, respectively.

In the preferred embodiment, two modulation rates are used on different carrier frequencies. A "normal" modulation rate $f_b = 2400$ Hz on a 1700 Hz carrier is used for full and half speed transmission rates of 9600 bps (bits per second) and 4800 bps, respectively. For diagnostic purposes, a "fall-back" modulation rate of 1200 Hz on a carrier $f_c = 1800$ Hz is used corresponding to a transmission rate of 1200 bps. At the normal modulation rate of 2400 Hz, the phase alternations are formed by phase jumps of ±135 degrees for 9600 bps and ±90 degrees for 4800 bps. In FIG. 2A, the power spectral density of the first part of the training signal is shown. Strong spectral components appear at $f_1 = 500$ Hz, $f_2 = 2900$ Hz and at the carrier frequency $f_c = 1700$ Hz. It should be noted that $f_1$ and $f_2$ are calculated as follows:

$$f_1 = f_c - \tfrac{1}{2}f_b$$

$$f_2 = f_c + \tfrac{1}{2}f_b$$

Figure 2B:
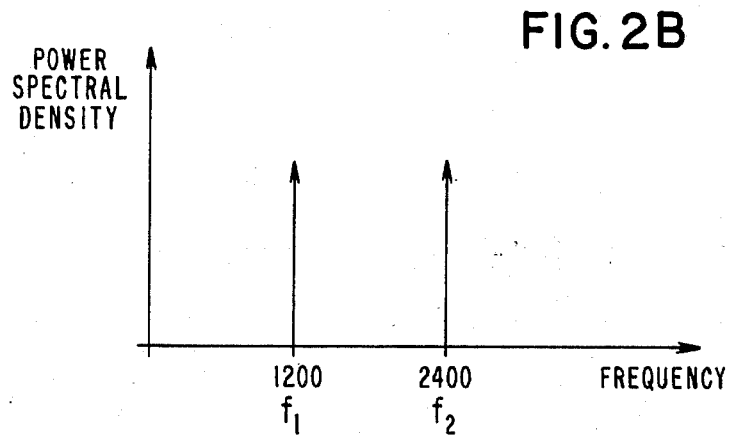

At the fall-back modulation rate, the phase alternations are formed by ±180 degree phase jumps. This results in the spectrum shown in FIG. 2B with strong spectral components at $f_1 = 1200$ Hz and $f_2 = 2400$ Hz.

The difference in the spectra is used as a basis for modulation rate recognition. If, at the start of an input signal, no training signal is received, the spectrum will not contain the above-mentioned combination of strong spectral lines. Thus, if a scrambled data signal is received, the spectrum will be rather flat. However, the signal can still be discriminated from an incoming noise signal by utilizing the level of the carrier frequency component, which, over a certain time period, will be stronger for a scrambled data signal than for noise.

The characteristics of the spectra of the training signals are used for timing initialization. The phase difference between the $f_1$ and $f_2$ components ($\phi = \phi_2 - \phi_1$) will provide a measure for the optimal sample timing adjustment. When the receiver clock phase is shifted over a time $\phi(2=f_b)$, it is found that optimal timing is achieved.

In the preferred embodiment, the number of received alternations is 18, suitable for the training of a 9600 bps modem. At the normal modulation rate of $f_b = 2400$ Hz and a sample rate of $f_s = 9600$ Hz, only 72 samples are available for timing initialization, since $f_s/f_b \times 18 = 72$.

As will be described in more detail hereinafter, the present embodiment utilizes a Discrete Fourier Transform (DFT) filter, to measure the correlation of the input signal with a locally-generated frequency according to the equation.

$$(P,Q)_f = \sum_{k=0}^{n-1} A(k) \cdot [\cos(2\pi k f/f_s), \sin(2\pi k f/f_s)] \quad (1)$$

where:
$(P,Q)_f$ = real and imaginary parts of DFT component of frequency f
$A(k)$ = input sample k
f = locally-generated frequency
$f_s$ = sample frequency
n = number of samples The DFT filter output is a vector of which the angle represents the phase difference between the locally-generated frequency and the appropriate frequency component in the input signal. The length of the output vector is a measure of the relative power of that component.

Figure 3:
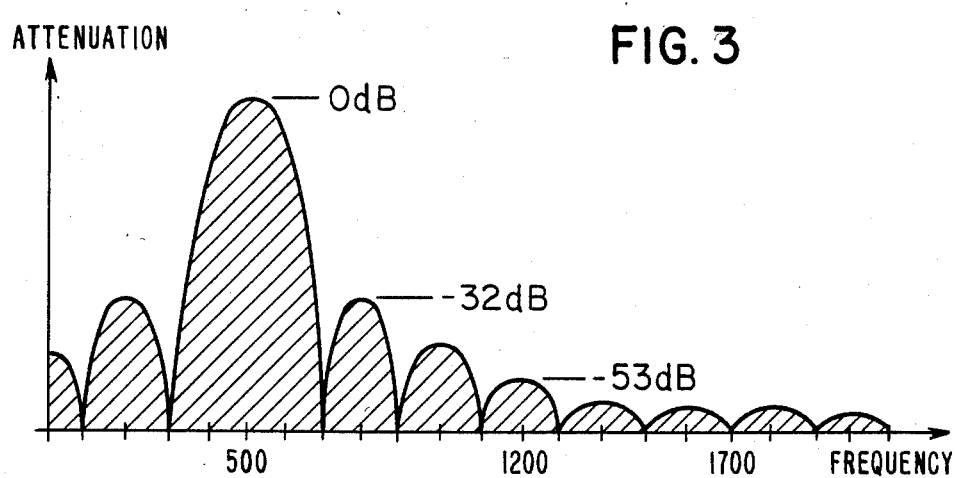
FIG. 3 is a plot illustrating the frequency response (attenuation) of a Discrete Fourier Transform circuit.

FIG. 3 shows a plot of the frequency response of a DFT filter for $f = 500$ Hz, $f_s = 9600$ Hz and $n = 48$. For these values, the resolution of the filter is 200 Hz. As can be clearly seen, the other frequency components at 200 Hz intervals from frequency f (including 1700 Hz and 2900 Hz) are completely suppressed. The DFT filters for the other relevant frequency components (1200 Hz, 1700 Hz, 2400 Hz, 2900 Hz, $n = 48$, $f_s = 9600$ Hz) show similar characteristics, i.e., a DFT filter for 1200 Hz suppresses 2400 Hz;
a DFT filter for 1700 Hz suppresses 500 Hz and 2900 Hz;
a DFT filter for 2400 Hz suppresses 1200 Hz; and
a DFT filter for 2900 Hz suppresses 500 Hz and 1700 Hz.

An advantage of this arrangement is that no notch filter around the carrier frequency is required, thus eliminating turn-on effects. Furthermore, the input signal does not have to be rectified to produce a modulation rate component.

Figure 4:
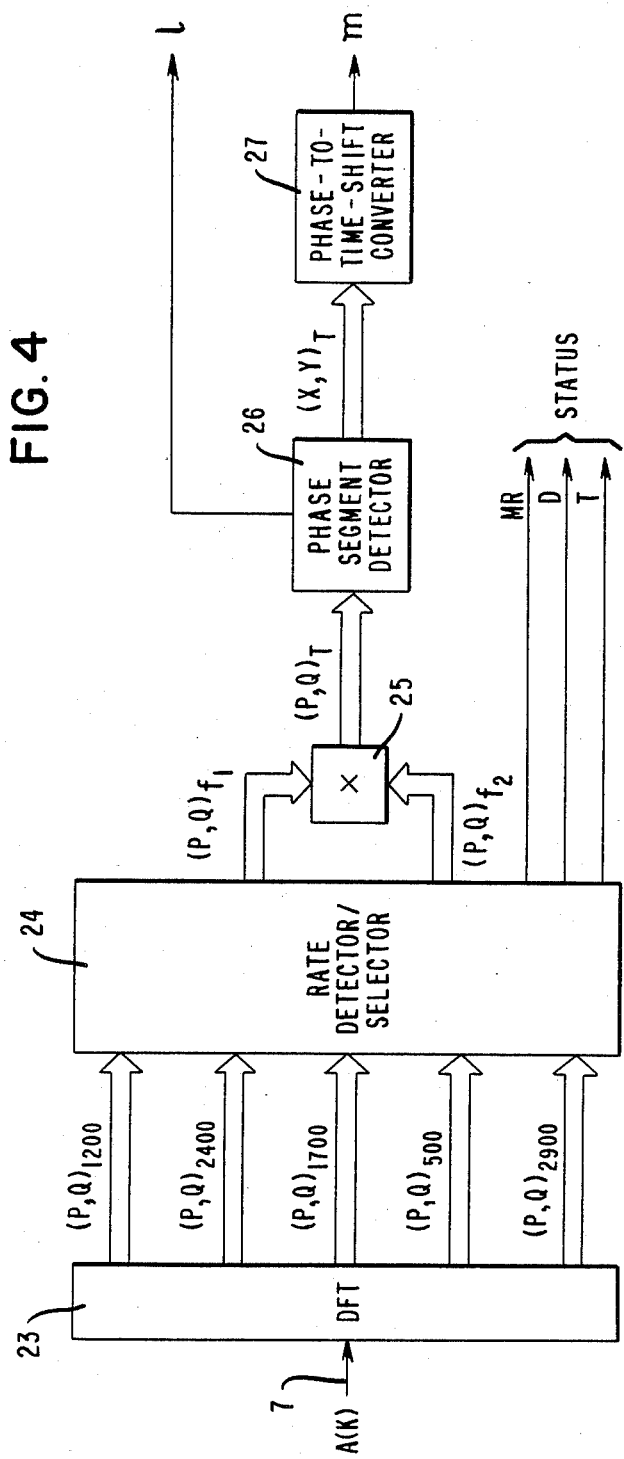
FIG. 4 is a block diagram of the timing initialization circuit included in the modem receiver of FIG. 1.

In FIG. 4, the basic elements of the timing initialization circuit 17, FIG. 1 are shown. The circuit 17 is composed of a DFT circuit module 23 that utilizes 48 digitized received signal samples to produce the relevant vectors $(P,Q)_f$. For the 9600 bps modem of the preferred embodiment, these vectors are calculated for the frequency components 500 Hz, 1200 Hz, 1700 Hz, 2400 Hz and 2900 Hz.

The vectors are applied to a rate detector/selector circuit 24 which includes decision logic that evaluates the vectors produced by the DFT circuit module 23 and determines the modulation rate and the type of signal being received. A STATUS signal is passed to the receiver control circuit 22 containing information about the received modulation rate (MR), whether a training sequence was received (T) and, in the case of no training, whether a data signal or a noise signal was received (D). Furthermore, the circuit 24 selects the two vectors of the frequency components $f_1$ and $f_2$ that correspond to the detected modulation rate.

The two vectors are multiplied in a complex conjugate multiplier 25 to produce a vector $(P,Q)_T$. It should be understood that a complex conjugate multiplier is a circuit which multiplies one complex number by the conjugate of another complex number. The phase $\phi$ of this vector $(P,Q)_T$ is equal to the phase difference between the vectors $(P,Q)_{f1}$ and $(P,Q)_{f2}$ and is used for adjustment of the sample timing.

For optimal timing, the receiver clock phase must be shifted over a time $\phi(2\pi f_b)$ where $\phi$ is in radians. For sample to signal element synchronization, each shift over $1/f_s$ means one sample shift. Therefore, the phase plane is divided in $f_s/f_b$ segments, numbered $\iota$; for the normal modulation rate of 9600 bps, a segment is 90°. A segment detector 26 determines in which segment $(P,Q)_T$ is located. The sample control circuit 21 (FIG. 1) uses the result $\iota$ to select the correct sample for signal element (symbol) synchronization.

In the phase segment detector circuit 26, the vector $(P,Q)_T$ is rotated by $\iota$ segments, such that it is located in the first segment between the $-(f_b/f_s)\cdot-180°$ and $+(f_b/f_s)\cdot180°$ lines. Thus, for the 9600 bps modem, the rotated vector is located between $+45°$ and $-45°$. The rotated vector is designated $(x,y)_T$.

A phase-to-time-shift converter 27 determines the phase of the vector $(x,y)T$ and converts it to a counter value m. When supplied to the PCO circuit 19, the counter value m will cause a shift of the sampling instants, such that optimal timing is achieved.

Figure 5:
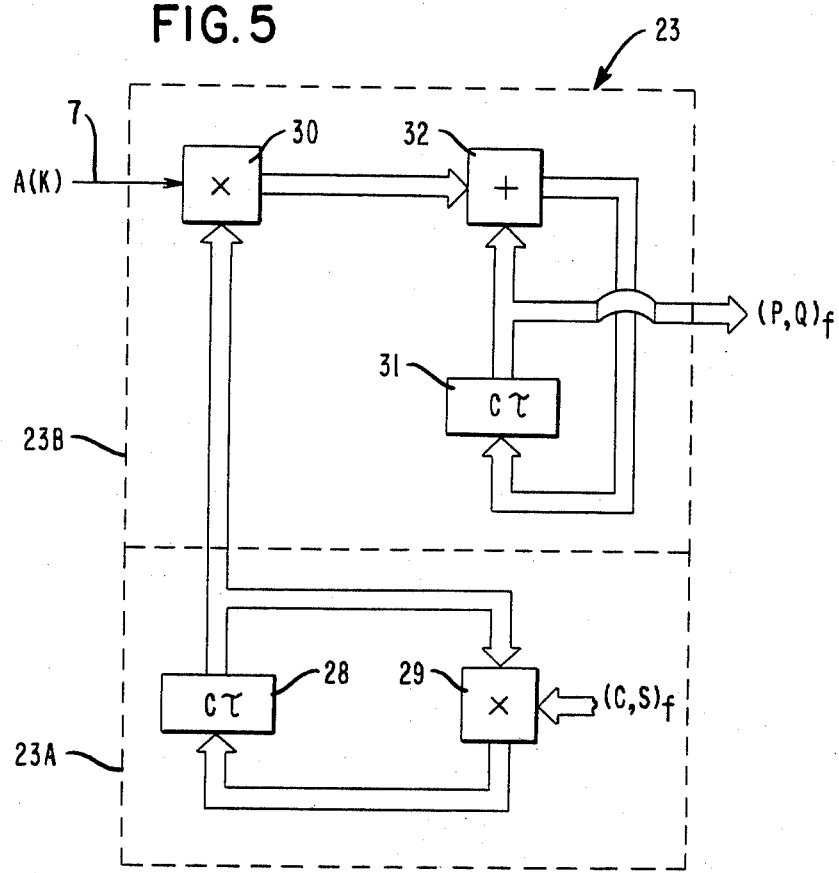
FIG. 5 is a block diagram of a Discrete Fourier Transform, circuit.

FIG. 5 shows an implementation of a DFT filter circuit for a typical frequency component. The DFT filter circuit consists of a lower portion 23A forming a local oscillator for generating sine and cosine terms and an upper portion 23B forming a correlator. The local oscillator 23A consists of a delay element 28 and a multiplier 29. The delay element 28 delays a complex value with a delay of $1/f_s$. It should be understood that, in a practical embodiment, complex valued quantities are represented by pairs of real valued quantities in the form of digital signals. Furthermore, it should be understood that the various processing circuit elements such as adders, multipliers and delays may be implemented by a digital signal processor integrated circuit. In response to energy detection in the circuit 20 in FIG. 1, the circuit 28 is initialized; e.g., with the vector (1,0), being the (cos, sin) term in equation (1) for $k=0$. At each sample interval, the delay element 28 is updated by the result of a complex multiplication in the multiplier 29 of the current contents of the delay element 28 with the constant vector $(c,s)_f$. The value of this vector is:

$$(c,s)_f = [\cos(2\pi f/f_s), \sin(2\pi f/f_s)]$$

where f is the frequency which is to be generated.

Each sample A(k) on the line 7 is multiplied in a multiplier 30 with the instantaneous value in the delay element 28. A delay element 31 stores the output of the DFT filter circuit. The circuit contents of the delay element 31 are added in an adder 32 to the output of the multiplier 30 to produce a new instantaneous value of $(P,Q)_f$. This result is again stored in the delay element 31. To provide a fast measurement of the frequency component 48, input samples are evaluated (n=48 in equation 1). In the present embodiment, five circuits corresponding to FIG. 5 are implemented in the DFT circuit module 23 of FIG. 4. The locally-generated frequencies are 500 Hz, 2900 Hz, 1200 Hz, 2400 Hz and 1700 Hz. The results for n=48 are the vectors $(P,Q)_{500}$, $(P,Q)_{2900}$, $(P,Q)_{1200}$, $(P,Q)_{2400}$ and $(P,Q)_{1700}$. All results are passed to the rate detector/selector circuit 24 (FIG. 4).

Figure 6:
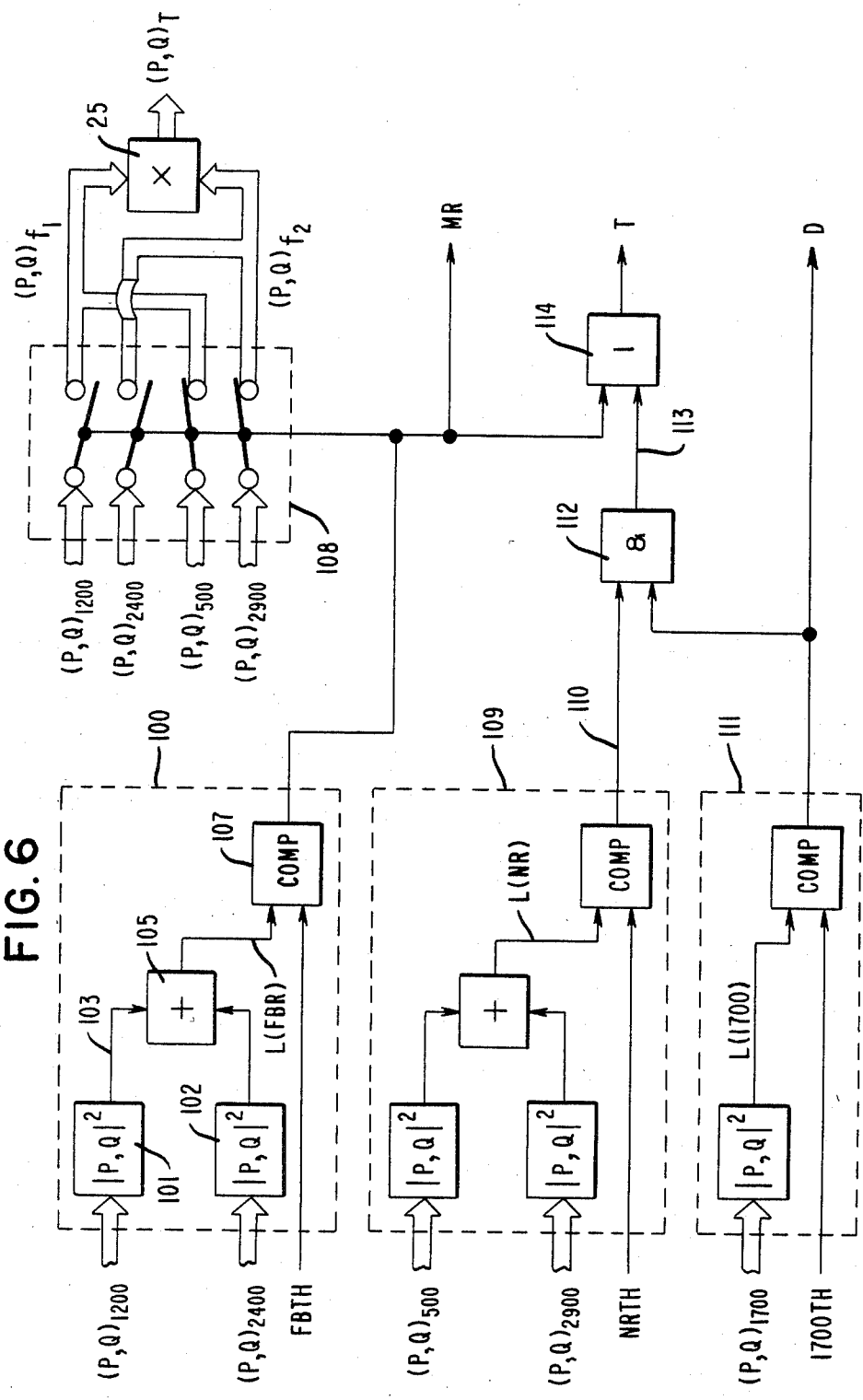
FIG. 6 is a block diagram of the rate detector/selector circuit included in the timing initialization circuit shown in FIG. 4.

The rate detector/selector circuit 24 (FIG. 6) includes three level detectors 100, 109, and 111, an AND circuit 112, an OR circuit 114 and a switch 108.

The level detector 100 produces an output signal MR which is low if the normal modulation rate is being received and is high if the fall-back modulation rate training is being received. This is accomplished by evaluation of the two spectral components $(P,Q)_{1200}$ and $(P,Q)_{2400}$ that are characteristic for the fall-back training sequence (see FIG. 2B). Circuits 101 and 102 produce the squared lengths of vectors $(P,Q)_{1200}$ and $(P,Q)_{2400}$, respectively. The sum of these lengths L(FBR), produced by an adder 105, is compared with a threshold value FBTH in a comparator 107. If L(FBR) is above the threshold value, the fall-back rate training sequence is assumed and the signal MR goes high.

The signal MR controls the switch 108 such that if MR is high, inputs $(P,Q)_{1200}$ and $(P,Q)_{2400}$ are selected as output signals (i.e., the fall-back modulation rate vectors are selected for further processing). Alternatively, with MR low, the normal modulation rate vectors $(P,Q)_{500}$ and $(P,Q)_{2900}$ are selected for further processing.

The level detector 109 produces an output signal 110 that is high if the sum L(NR) of the squared lengths of the normal rate vectors $(P,Q)_{500}$ and $(P,Q)_{2900}$ is above a threshold value NRTH.

The level detector 111 compares the squared length of the vector $(P,Q)_{1700}$, corresponding to the normal modulation rate carrier, with a threshold value 1700TH. A high output D indicates that a data signal is being received; if D is low, the received signal is assumed to be noise.

By combining the outputs of the level detectors, a determination can be made as to whether a training signal or a data signal is being received. The output signal 113 of the AND gate 112 is high if normal modulation rate training is being received (see FIG. 2A). The signal MR and the signal on the line 113 are applied to the OR gate 114 to provide an output signal T which is high when normal or fall-back rate training is being received. Table 1 summarizes how the outputs are interpreted.

TABLE 1

| MR | T | D | RECEIVED SIGNAL STATUS |
|---|---|---|---|
| 0 | 1 | X | normal modulation rate training |
| 1 | 1 | X | fall-back modulation rate training |
| 0 | 0 | 1 | normal rate data signal |
| 0 | 0 | 0 | noise or fall-back rate data signal |

Figure 7:
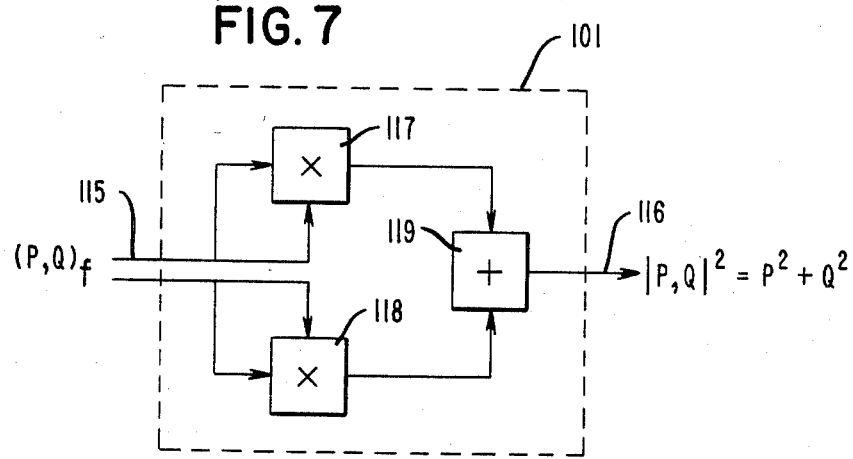
FIG. 7 is a block diagram of the squared length determination circuit included in the rate detector/selector circuit shown in FIG. 6.

FIG. 7 shows an embodiment of the circuit 101 which produces the square of the vector length of the complex value supplied on its input 115. This is achieved by squaring the real part P of the input in 117 and the imaginary part Q in 118. By summing these squares in an adder 119, the square of the length of the input vector is obtained. The circuit 102 and the other circuits shown in FIG. 6 as providing squared vector length outputs are of similar construction.

Figure 8:
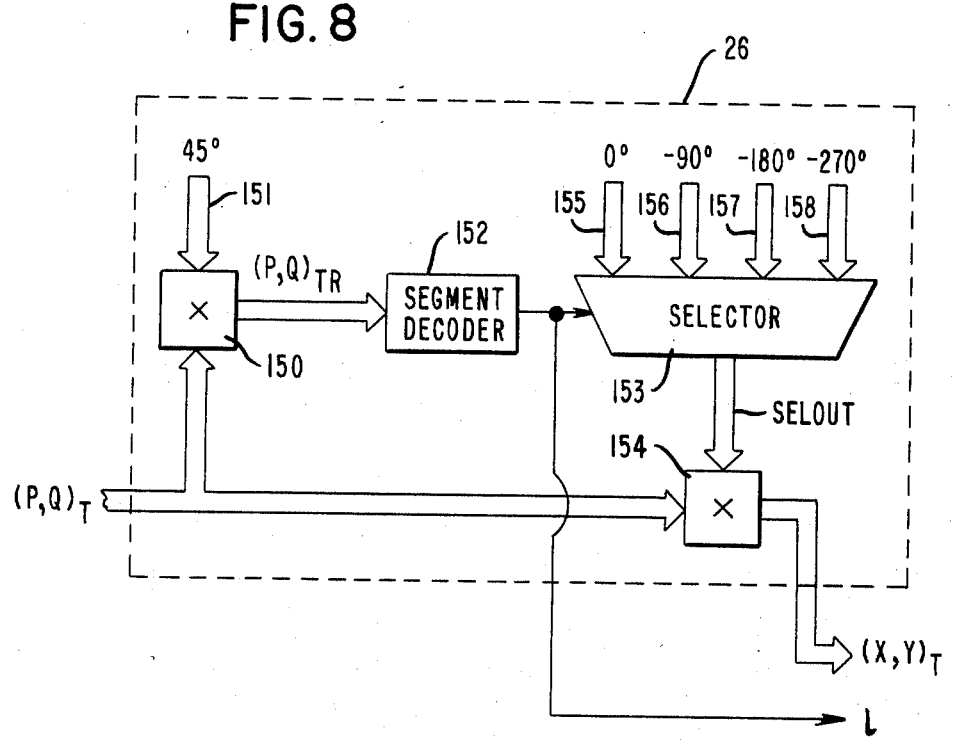
FIG. 8 is a block diagram of the phase segment detector circuit included in the timing initialization circuit shown in FIG. 4.

The phase segment detector 26 which is shown in FIG. 8 produces a complex output signal $(x,y)_T$ and an output signal $\iota(=0, 1, 2,$ or 3). The signal $(x,y)_T$ is a phase-rotated version of input $(P,Q)_T$. The rotation is such that the phase of $(x,y)_T$ is within 45° from a 0° reference line. The output signal $\iota$ indicates how many multiples of 90° were applied to derive the desired phase of $(x,y)_T$.

To determine the phase shift to be applied, the input $(P,Q)_T$ is first rotated 45°. This is achieved by multiplication in a multiplier circuit 150 with a constant vector applied over a line 151. Thus, instead of comparing $(P,Q)_T$ with n.90°+45° boundaries, $(P,Q)_{TR}$ can be compared with n.90° boundaries, which is equivalent to a determination of the signs of the real and imaginary part of $(P,Q)_{TR}$. This determination is illustrated in Table 2 and takes place in the decoder 152.

TABLE 2

| Im $(P,Q)_{TR}$ | Re $(P,Q)_{TR}$ | | SELOUT |
|---|---|---|---|
| + | + | 0 | 0° |
| + | − | 1 | −90° |
| − | − | 2 | −180° |
| − | + | 3 | −270° |

The output $\iota$ is applied to a selector circuit 153 which selects one of four possible constant vectors (155, 156, 157, 158) and outputs the selected vector as the SELOUT signal. The four constant vectors represent phase shifts of 0°, −90°, −180°, and −270°.

Multiplication of SELOUT with the input signal $(P,Q)_T$ in 154 will yield a new vector $(x,y)_T$ with a phase that is rotated by an amount corresponding to the SELOUT signal.

Figure 9:
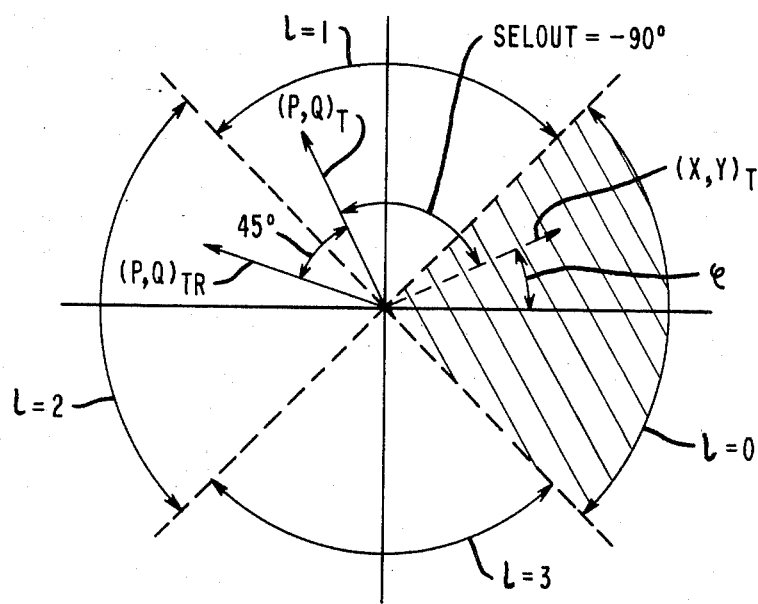
FIG. 9 is a phase diagram illustrating the operation of the phase segment detector circuit shown in FIG. 8.

FIG. 9 shows the phase normalization process in a graphical way. The shaded area reflects the quadrant where $(x,y)_T$ must be located. The dashed lines are the boundaries against which $(P,Q)_T$ must be evaluated. The bounded segments are numbered $\iota=0$, $\iota=1$, $\iota=2$ and $\iota=3$. As can be seen, vector $(P,Q)_T$ is rotated through 45° yielding $(P,Q)_{TR}$. This vector has a negative real part and a positive imaginary part. According to Table 2, the decoder should provide a value of $\iota=1$. Multiplier 154 rotates vector $(P,Q)_T$ by −90° to yield vector $(x,y)_T$. As shown, this vector $(x,y)_T$ is within the shaded segment.

The result $\iota$ is used by the sampler control circuit 21 to select the correct sample for signal element synchronization. The implementation described is designed primarily for the normal modulation rate ($f_b=2400$ Hz). For the fall-back modulation rate $f_b=1200$ Hz, with $i=f_s/f_b=8$, the phase plane should be divided into 8 segments (8 samples per symbol). However, since the fall-back modulation rate training is usually less time-critical, the phase segment detector implementation for the full modulation rate can be used. By multiplying $\iota$ by 2 the sampler control circuit will select sample number 1, 2, 4 or 6. The introduced error will be corrected by the phase-to-time-shift converter 27.

Figure 10:
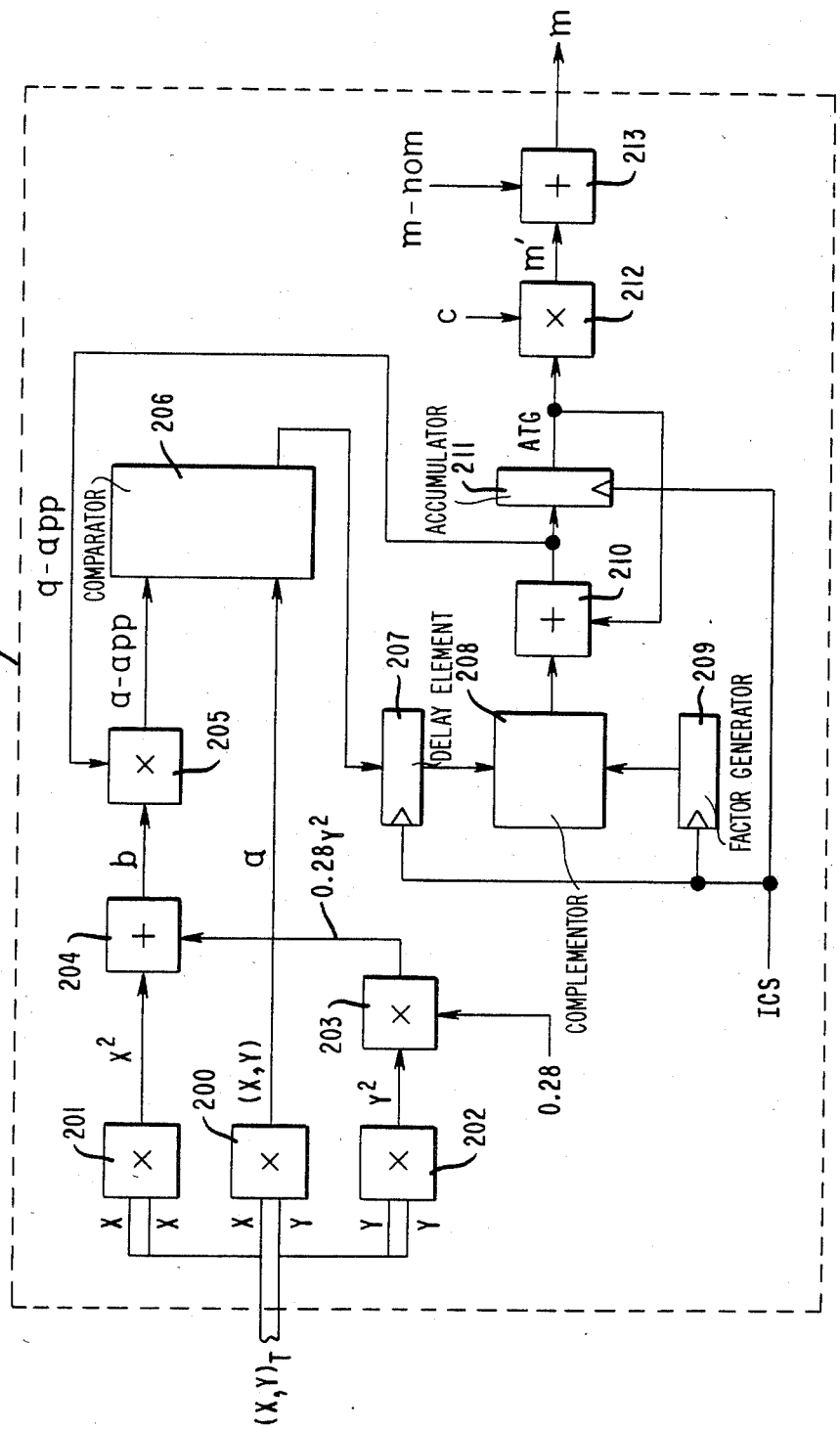
FIG. 10 is a block diagram of the phase to time shift converter circuit shown in FIG. 4.

FIG. 10 shows an embodiment of the phase-to-time-shift converter 27. Its function is to convert the input vector $(x,y)_T$ (with an angle in the area between ±45° shaded area of FIG. 9) into a number m which linearly changes the phase of the sample clock by means of the PCO circuit 19. The phase of $(x,y)_T$ is defined as arctan $(y/x)$. To implement the arctan function a known approximation method has been chosen:

$$\arctan z = z/(1+0.28z^2)$$

The error made with this approximation is less than 0.3 degrees within the required interval of 45 degrees. For the angle of vector $(x,y)_T$, this means:

$$\arctan (y/x) = xy/(x^2+0.28y^2) \qquad (2)$$

FIG. 10 shows an implementation for equation (2). A multiplier 200 multiplies the real and imaginary parts of $(x,y)_T$ to produce the dividend $a=xy$ of equation (2). Multipliers 201 and 202 produce $x^2$ and $y^2$ respectively. In multiplier 203, $y^2$ is multiplied with the constant 0.28. Summation of $x^2$ and $0.28y^2$ is performed in the adder 204 to form the divisor $b=x^2+0.28y^2$.

The division of a/b is performed by successive approximation in the circuit blocks referenced 205 through 211. The approximation is effected by successively generating factors $2^{-1}, 2^{-2}, 2^{-3} \ldots, 2^{-n}$ and adding/subtracting these to/from an accumulated result that most closely approaches the quotient a/b. This iteration process, which utilizes six steps in the present implementation, is clocked by a signal ICS.

Firstly, an interim quotient (q-app) is multiplied with b in a multiplier 205 to yield an approximation a-app of a. This signal is applied to a comparator 206 together with the signal a. The output of the comparator 206, which is positive or negative according as the signal a is greater or smaller than a-app, is stored in delay element 207 to provide a sign input to a complementor 208.

For each iteration step, a factor generator 209 provides the factors $2^{-1}, 2^{-2}$, etc. to the complementor 208 where the sign, input from the delay element 207 is appended. This sign is the result of the previous iteration step. The signed factor is applied to an adder 210 which adds the signed factor to the interim result ATG of previous iteration step. The output of the adder 210 is stored in an accumulator 211 as the current result of the approximation. Also, the output of the adder 210 is fed back to the multiplier 205 as an interim quotient (q-app).

The first two iteration steps will now be described. Step 1 is an initialization step where the factor generator 209 supplies a factor zero in response to the first ICS clock. The sign stored in the delay element 207 is undetermined. The output of the complementor 208 produces (signed) zero which is stored in the accumulator 211 and fed to the multiplier 205. As a result, the output of the multiplier 205 becomes zero and thus the output of the comparator 206 incorporates the sign of input a. At the second ICS clock the sign of a is stored in the delay element 207 and the factor $2^{-1}$ is provided by the factor generator 209. The complementor 208 outputs the signed factor $2^{-1}$ to the adder 210 which adds this to the contents (equal to zero) of the accumulator 211 and applies the result to the inputs of the accumulator 211 and the multiplier 205. At the third ICS clock, the interim result is stored in accumulator 211. In addition, a new factor is produced by the factor generator 209 and a new sign is stored in the delay elements 207.

In the present embodiment six factors are applied from the factor generator 209, and after all the corresponding iteration steps have been performed, the approximated result, signal ATG, is applied to a multiplier 212 which scales the signal ATG by multiplying by a scaling factor C. The output signal m' is input to adder 213, where it is added to a signal m-nom, which represents a nominal value of the signal m. Thus, the arrangement is such that when m'=0 the output of the adder 213 equals m-nom. The adder output m is a signal that is suitable for controlling PCO circuit 19. When the phase of $(x,y)_T$ is 45°, then m is maximal. This results in a time shift of $+\frac{1}{2}$ sample. When the phase of $(x,y)_T$ is $-45°$, then m is minimal, resulting in a time shift of $-\frac{1}{2}$ sample.

For the fall-back modulation rate the same circuit is used. To correct the error that was introduced by the phase segment detector, the output m is passed twice to the PCO circuit 19. A phase of $(x,y)_T$ of $\pm 45°$ thus results in a time shift of $\pm 1$ sample.

We claim:

1. In a data receiving apparatus for receiving a data modulated carrier signal and including a sampling circuit responsive to sampling clocks for sampling the received signal, a phase controlled oscillator for developing the sampling clocks, and an analog-to-digital converter for converting the sampled received signal to a digitized sampled received signal, a timing adjustment system comprising:

a signal transform circuit including first and second Discrete Fourier Transform filter circuits and adapted to provide first and second complex signals as a function of the correlation between said digitized sampled received signal and each of first and second predetermined locally generated frequencies having values of $f_c - \frac{1}{2}f_b$ and $f_c + \frac{1}{2}f_b$, respectively, where $f_c$ and $f_b$ are the carrier frequency and the modulation frequency, respectively;

complex conjugate multiplier means being responsive to said first and second complex signals for providing a complex output signal; and conversion means responsive to said complex output signal for applying an adjustment signal to said phase controlled oscillator to selectively adjust the phase of said sampling clocks to define the sampling instants at which said received signal is sampled.

2. The timing adjustment system of claim 1 wherein each of said Discrete Fourier Transform filter circuits includes:

a first portion adapted to generate a complex value signal representing an associated locally-generated frequency; and a second portion responsive to said digitized sampled received signal and to said complex value signal for generating one of said complex signals as a function of the correlation between said digitized sampled received signal and said associated locally-generated frequency.

3. The timing adjustment system of claim 1 wherein said conversion means includes:

phase segment detection means responsive to said complex output signal for generating a complex rotated signal having a phase angle lying within predetermined phase limits; and adjustment signal generating means responsive to said complex rotated signal for applying said adjustment signal to said phase controlled oscillator.

4. The timing adjustment system of claim 3 wherein said adjustment signal generating means includes:

computation means responsive to said complex rotated signal for developing a phase angle signal approximating the phase angle of said complex rotated signal; and signal processing means responsive to said phase angle signal for providing said adjustment signal.

5. The timing adjustment system of claim 4 wherein said signal processing means includes:

scaling factor means for multiplying said phase angle signal by a constant factor to provide a scaled phase angle signal; and additional means for adding said scaled phase angle signal to a nominal value to derive said adjustment signal.

6. The timing adjustment system of claim 1 wherein said data modulated carrier signal contains data modulated at a selected one of a plurality of modulation rates on a selected one of a plurality of carrier rates, and wherein said signal transform circuit includes:

a plurality of Discrete Fourier Transform filter circuits adapted to provide a corresponding plurality of complex signals representing the correlation between said digitized sampled received signal and each of a plurality of predetermined locally-generated frequencies dependent on the power spectral density components of the respective modulation rates; and selection means for selecting the pair of complex output signals corresponding to the selected modulation rate for application to said complex conjugate multiplier means.

7. The timing adjustment system of claim 6 wherein each of said Discrete Fourier Transform filter circuits includes:

a first portion adapted to generate a complex value signal representing an associated locally-generated frequency; and a second portion responsive to said digitized sampled received signal and to said complex value signal for generating one of said complex signals as a function of the correlation between said digitized sampled received signal and said associated locally-generated frequency.

8. The timing adjustment system of claim 6 wherein said selection means includes:

first level detection means responsive to a first predetermined pair of said complex signals corresponding to a first predetermined one of said modulation rates for comparing a value dependent on the length of the vectors associated with said first predetermined pair of said complex signals with a first fixed threshold value to provide a modulation rate indication signal indicating whether said first predetermined modulation rate is effective.

9. The timing adjustment system of claim 8 wherein said selection means further includes:

switching means arranged to receive a plurality of pairs of said complex signals, said switching means being responsive to said modulation rate indication signal for passing a pair of complex signals corresponding to the effective modulation rate.

10. The timing adjustment system of claim 9 wherein said selection means further includes:

second level detection means responsive to a second predetermined pair of said complex signals corresponding to a second predetermined one of said modulation rates for comparing a value dependent on the length of the vectors associated with said second predetermined pair of said complex signals with a second fixed threshold value to provide a comparison signal;

third level detection means responsive to a predetermined one of said complex signals for comparing a value dependent on the length of a vector associated with said predetermined one of said complex signals with a third threshold value to provide a data indicating signal indicating whether a data signal is being received; and logic circuit means responsive to said modulation rate indication signal, said comparison signal and said data indicating signal for providing a training indicating signal indicating whether a training signal or a data signal is being received.

11. The timing adjustment system of claim 10 wherein each of said first and second level detection means includes:

an associated pair of squared length determinator circuits adapted to compute the squared lengths of the vectors corresponding to the associated pair of said complex signals applied thereto;

an associated adding means for adding said computed lengths of the vectors from said associated pair of squared length determinator circuits to provide an associated sum output signal; and an associated comparator for comparing said associated sum output signal with an associated one of said first and second threshold values.

12. The timing adjustment system of claim 11 wherein each of said Discrete Fourier Transform filter circuits includes:

a first portion adapted to generate a complex value signal representing an associated locally-generated frequency; and a second portion responsive to said digitized sampled received signal and to said complex value signal for generating one of said complex signals as a function of the correlation between said digitized sampled received signal and said associated locally-generated frequency.

* * * * *